| United States Patent [19] | [11] Patent Number: 4,803,132 |
|---|---|
| Kishimoto et al. | [45] Date of Patent: Feb. 7, 1989 |

[54] MAGNETIC RECORDING MEDIUM

[75] Inventors: Mikio Kishimoto, Osaka; Tetsuya Nakazumi, Ikeda; Tomoji Kawai, Minoo; Shichio Kawai, Suita, all of Japan

[73] Assignee: Hitachi Maxell, Ltd., Osaka, Japan

[21] Appl. No.: 47,326

[22] Filed: May 8, 1987

[30] Foreign Application Priority Data

May 9, 1986 [JP] Japan ................................ 61-106372

[51] Int. Cl.$^4$ .............................................. G11B 5/706
[52] U.S. Cl. .................................. 428/141; 252/62.56; 427/128; 428/323; 428/329; 428/403; 428/694; 428/900
[58] Field of Search ............... 428/329, 323, 403, 694, 428/900, 141; 427/128; 252/62.56

[56] References Cited

U.S. PATENT DOCUMENTS

| 4,444,835 | 4/1984 | Togawa et al. | 428/329 |
| 4,539,261 | 9/1985 | Nakata et al. | 428/403 |
| 4,555,431 | 11/1985 | Miyatsuka | 428/141 |
| 4,657,816 | 4/1987 | Siddig | 428/403 |
| 4,663,209 | 5/1987 | Aonuna et al. | 428/141 |
| 4,686,142 | 8/1987 | Kiemle et al. | 428/403 |

*Primary Examiner*—Paul J. Thibodeau
*Attorney, Agent, or Firm*—Birch, Stewart, Kolasch & Birch

[57] ABSTRACT

A magnetic recording medium with high output power and improved durability which comprises a nonmagnetic substrate and a magnetic layer formed thereon containing magnetic powder and a binder, wherein the magnetic powder comprises a nuclear crystal consisting of magnetic oxide powder and a magnetic metallic layer formed thereon containing cobalt, and the magnetic layer has coercive force of not more than 1,000 Oe and saturation magnetic fluex density of not less than 1,800 gauss.

6 Claims, No Drawings

MAGNETIC RECORDING MEDIUM

BACKGROUND OF THE INVENTION

1. Field of the Invention

The present invention relates to a magnetic recording medium such as a magnetic tape or magnetic disc. More particularly, it relates to a magnetic recording medium which comprises a non-magnetic substrate and a magnetic layer formed thereon containing magnetic powder and a binder.

2. Description of the Prior Art

Conventional magnetic recording mediums have a magnetic layer which is generally prepared by coating on a non-magnetic substrate, such as a polyester film, a magnetic paint containing magnetic powder and a binder and then drying it. Electromagnetic conversion properties of the magnetic recording medium are generally defined by saturaion magnetic flux density (Bs) and the surface smoothness of the magnetic layer. The higher the saturation magnetic flux density and surface smoothness, the higher output in recording and reproduction. Therefore, various attempts to improve such properties have been made to satisfy a recent requirement of enhancing the functions of the magnetic recording medium.

Conventionally it is believed that it is most effective to use a magnetic powder contained in the magnetic layer having high saturation magnetization ($\sigma_s$) in order to enhance the saturation magnetic flux density, and it is particularly effective to use fine magnetic powder having a small average particle size, i.e. a large BET specific surface area, in order to improve the surface smoothness. In view of the above, it is believed that among the conventional magnetic powders, powder of magnetic metal oxide such as $\gamma$-$Fe_2O_3$ or $Fe_3O_4$ is not suitable since it leads to low saturation magnetization and unsatisfactory saturation magnetic flux density of the magnetic recording medium even if the powder is fine, while magnetic metallic powder having a high saturation magnetization and a small average particle size, such as iron powder, is suitable.

However, such a magnetic metallic powder has high coercive force (Hc) and it is very difficult to control the coercive force to the value of not more than 1,000 Oe, and the finer the powder is, the higher the coercive force of the magnetic recording medium is. Therefore, as a magnetic head used for recording and reproduction of the magnetic recording medium, an expensive metallic head such as an amorphous or Sundust head should be used. But, a widely used ferrite head can not lead to sufficient properties. To achieve durability required for the magnetic recording medium in addition to the electromagnetic conversion properties, the magnetic recording medium utilizing the magnetic metallic powder is much worse than one utilizing the magnetic oxide powder.

A magnetic recording medium which utilizes metallic powder having a small BET specific surface area, i.e. the large average particle size, can have a coercive force of not more than 1,000 Oe, but the magnetic layer has a much worse surface smoothness as described above. A magnetic recording medium utilizing magnetic oxide powder can have a controlled coercive force of not more than 1,000 Oe without deteriorating the surface smoothness and has good durability, but it cannot achieve high saturation magnetic flux density as described above.

SUMMARY OF THE INVENTION

An object of the present invention is to provide a magnetic recording medium which a high output power, can be used with a ferrite head in recording and reproduction and has good durability.

This and other objects are accomplished by a magnetic recording medium which comprises a non-magnetic substrate and a magnetic layer formed thereon containing magnetic powder in a binder, wherein the magnetic powder comprises a nuclear crystal consisting of magnetic oxide powder and a magnetic metallic layer formed thereon containing cobalt, the resulting magnetic layer having a coercive force of not more than 1,000 Oe and saturation magnetic flux density of not less than 1,800 gauss.

DETAILED DESCRIPTION OF THE INVENTION

The magnetic powder used in the recording medium according to the present invention comprises a nuclear crystal consisting of magnetic oxide powder and the magnetic metallic layer formed thereon containing cobalt. The presence of the magnetic metallic layer imparts much higher saturation magnetization than the usual magnetic oxide powder constituting the nuclear crystal, and a magnetic recording medium utilizing this magnetic powder can have high saturation magnetic flux density of not less than 1,800 as defined in the present invention. Since such magnetic powder has a higher coercive force than the magnetic oxide powder constituting the nuclear crystal alone but much lower coercive force than general magnetic metallic powder, the magnetic recording medium can have a controlled coercive force of not more than 1,000 Oe even if the powder is so fine that the surface smoothness is not deteriorated. Therefore, the magnetic recording medium according to the present invention which has a saturation magnetic flux density and coercive force of the magnetic layer in the above defined ranges by utilizing the magnetic powder, can generate very high output power even if a ferrite head is used in recording and reproduction.

The magnetic recording medium according to the present invention has substantially the same good abrasion resistance of the magnetic layer as one utilizing conventional magnetic oxide powder and therefore good durability. While the reason therefor has not been clearly known, it may be that because the magnetic metallic layer formed on the magnetic oxide powder according to the present invention is very hard since it comprises cobalt as the main component, the powder particles as a whole exhibit substantially the same hardness as the magnetic oxide powder constituting the nuclear crystal, and the magnetic layer containing them has good abrasion resistance. However, the magnetic powder containing the usual magnetic metal other than cobalt, such as iron or nickel as the main component, has the softer metallic layer coated on the surfaces of the harder magnetic oxide powder constituting the nuclear crystal, and it is necessary to increase the thickness of the magnetic metallic layer to increase the saturation magnetic flux density of the magnetic layer as described above. Since the powder particles are soft as a whole, the magnetic layer containing them has a lesser abrasion resistance than one containing the conventional magnetic oxide powder.

The magnetic powder comprising the magnetic metallic layer containing cobalt as the main component preferably has a coercive force of not more than 1,000 Oe and more preferably not more than 900 Oe and a saturation magnetization of about 80 to 110 emu/g. When the coercive force of the powder is more than 1,000 Oe, it is difficult to control the coercive force of the magnetic layer of the magnetic recording medium so that it is not more than 1,000 Oe. When the saturation magnetization is less than 80 emu/g, it is impossible to provide the magnetic recording medium with the saturation magnetic flux density of not less than 1,800 gauss.

The magnetic metallic layer may consist of only metallic cobalt, although it may consist of an alloy of cobalt with other magnetic metal such as nickel or iron. An alloy of cobalt with nickel is particularly suitable. The alloy must contain cobalt as the main component, i.e. in an amount of not less than 50% by weight, preferably not less than 60% by weight. When the amount of cobalt is less than 50%, the magnetic recording layer has poor durability. An amount of the magnetic metallic layer is preferably about 5 to 50% by weight per whole weight of the magnetic powder particles containing it. When the amount is less than 5% by weight, the saturation magnetization of the magnetic powder and in turn the saturation magnetic flux density of the magnetic layer cannot be high. When the amount is more than 50% by weight, the coercive force of the magnetic powder and the magnetic layer can hardly be low.

The magnetic powder having the magnetic metallic layer is preferably fine particles having a BET specific surface area of not less than 30 m$^2$/g. When the specific surface area is less than 30 m$^2$/g, the magnetic recording medium can hardly generate high output power since surface smoothness of the magnetic layer is deteriorated.

Examples of magnetic oxide powder constituting the nuclear crystal of the magnetic powder include magnetic iron oxide powder such as $\gamma$-$Fe_2O_3$, $Fe_3O_4$, intermediate oxide thereof, magnetic cobalt-containing iron oxide powder containing cobalt as a homogeneous solid solution in the powder or as a surface layer of cobalt oxide, magnetic chromium oxide powder, hexagonal system ferrite powder such as barium, strontium or lead ferrite powder. Particularly the magnetic iron oxide powder, the magnetic cobalt-containing iron oxide powder and barium ferrite powder are preferred. Preferably, the magnetic powder other than the hexagonal system ferrite powder comprises acicular particles having an average axial ratio (a length along the major axis/a length along the minor axis) of not less than 3, preferably not less than 4 and an average length along the major axis of about 0.1 to 0.5 $\mu$m. Among the hexagonal system ferrite powder, a platelet hexagonal particle having an average length along the major axis of about 0.03 to 0.2 $\mu$m is preferable.

The magnetic metallic layer on the nuclear crystal can be formed by conventional procedures. For example, it can be formed by any of those general procedures which are used to form a metallic layer, such as an electroless plating and a procedure which utilizes photocatalytic reaction as described in Japanese Patent Application No. 141033/1984 (Japanese Patent Kokai Publication No. 61-20302).

The procedure which utilizes photocatalytic reaction comprises depositing a desired metal by reduction on the magnetic oxide powder by utilizing semi-conductive property of the powder. For example, in water or other liquid medium which dissolves a cobalt salt and optional other metal salt such as a nickel salt, a suitable reductant, for example, sodium hypophosphite, hydrazine, formalin, ethanol, formic acid or sodium formate is dissolved, and then the magnetic oxide powder is dispersed in the solution.

The dispersion is then subjected to radiation having larger energy than band gap between a valence band and a conductive band so that electrons generate in the conductive band and positive holes generate in the valence band. The electrons and positive holes immediately disperse in the fine particle to reach a surface thereof. Among them, the positive holes react with the reductant in the dispersion to disappear so that only electrons are accumulated. The accumulation of the electrons causes the magnetic oxide powder having negative electrification to draw metal ions including cobalt ions having positive electrification. The drawn metal ions obtain electrons on the surfaces of the magnetic powder to be reduced so that the metal deposits on the surface.

In the photocatalytic reaction, a ratio of the metal salt including cobalt salt to the magnetic oxide powder is suitably selected, and a temperature of the dispersion during the reaction is preferably not higher than 90° C., more preferably 10° to 60° C. The radiation is generally effected for about 0.5 to 50 hours according to a weight ratio of the magnetic metallic layer.

The dispersion may contain a complexing agent such as sodium citrate or sodium tartrate to assist the stable deposition of the metal, a pH adjusting agent such as boric acid, ammonium sulfate, sodium hydroxide, potassium hydroxide or ammonia to adjust pH of the dispersion, in addition to the magnetic oxide powder, the metal salt and the reductant. The dispersion preferably has pH of 6.0 to 11.0, more preferably 7.0 to 10.0.

Light essential to carry out the photocatalytic reaction has a larger energy than that of the band gap of the dispersed particles. The light preferably has wavelength of 200 to 800 nm. The radiation light is not necessarily monochromatic light, and polychromatic light from a light source of a xenon or mercury lamp can be used.

The magnetic powder which has the magnetic metal layer formed on the surface of the nuclear crystal consisting of the magnetic oxide powder has the preferable coercive force of not more than 1,000 Oe and a preferable saturation magnetization of about 80 to 110 emu/g as described above, by adjusting an amount of the magnetic metal layer to be deposited.

By using the magnetic powder having the magnetic metal layer and suitably adjusting its filling ratio in the magnetic layer, it is possible to provide the magnetic layer of the magnetic recording medium which has the coercive force of not more than 1,000 Oe to make a ferrite head usable during recording and reproduction and the saturation magnetic flux density of not less than 1,800 gauss, preferably not less than 2,000 gauss. When the saturation magnetization is less than 1,800 gauss, the magnetic recording medium has poor electromagnetic conversion properties and has insufficient output power in recording and reproduction.

The filling ratio of the magnetic powder necessary to provide the coercive force and saturation magnetic flux density of the magnetic layer in the above ranges depends on the magnetic property of the magnetic powder, the size of powder particle or the BET specific surface area, the kind of the magnetic oxide powder used as the nuclear crystal, and the like. An amount of the magnetic powder contained in the magnetic layer is preferably about 40 to 90% by weight. When the magnetic oxide powder constituting the nuclear crystal is the acicular magnetic iron oxide powder, the amount is preferably about 50 to 85% by weight.

The magnetic layer preferably has the surface roughness of not more than 0.03 μm, more preferably not more than 0.02 μm represented in terms of the center line average height (Ra value) measured by a tracer type surface roughness meter. When the surface roughness is more than 0.03 μm, the electromagnetic properties, particularly the output power is degraded. The surface roughness significantly depends on the size and filling ratio of the magnetic powder, and also on surface treatment conditions after the formation of the magnetic layer such as calendering treatment.

The binder may be any of the conventional ones and includes vinyl chloride-vinyl acetate copolymers, polyurethane resins, polyester resins, polyvinyl butyral resins, cellulose resins, isocyanate compounds, and a mixture of two and more of them.

To an organic solvent solution type or aqueous dispersion type magnetic paint which contains the binder and the magnetic powder, various conventional additives such as a dispersant, lubricant, abrasive or antistatic agent may be added.

The magnetic recording medium of the present invention may be produced by any conventional method. For example, the magnetic powder having the magnetic metallic layer is mixed with the binder and optional other additives to prepare a magnetic paint. Then the magnetic paint is coated on the non-magnetic substrate made of, for example, a polyester film and dried to prepare the magnetic layer having a desired thickness. The coated magnetic layer is surface treated by, for example, calendering and the coated substrate is cut or blanked in a desirable shape or size. The thickness of the magnetic layer is preferably about 0.3 to 6.0 μm.

PREFERRED EMBODIMENTS

The present invention will be hereinafter explained further in detail by following examples, wherein parts are by weight unless otherwise indicated.

EXAMPLE 1

Cobalt sulfate (160 g), nickel sulfate (46 g), sodium hypophosphite (150 g), sodium citrate (412 g) and boric acid (216 g) were dissolved in water (10 l), and then a suitable amount of sodium hydroxide was added to the aqueous solution to adjust pH of the solution to 9. γ-Fe$_2$O$_3$ powder (100 g) having the average length along major axis of 0.30 μm, the average axial ratio of 8, the coercive force of 310 Oe and the saturation magnetization of 74.0 emu/g was dispersed in this solution.

Then the dispersion was irradiated for 5 hours by a xenon lump of 1 kW (available from Usio Denki, Japan) with keeping the dispersion at 60° C. and stirring. The dispersed particles were separated from the dispersion, washed with water and dried to prepare magnetic powder having a magnetic alloy layer consisting of a cobalt-nickel alloy on surfaces of γ-Fe$_2$O$_3$ powder particles. The magnetic powder had the average length along major axis of 0.3 μm, the average axial ratio of 8, the coercive force of 550 Oe, the saturation magnetization of 92.2 emu/g and the BET specific surface area of 42.2 m$^2$/g.

The following components including the above magnetic powder were compounded for 48 hours in a ball mill to prepare magnetic paint:

| | |
|---|---|
| Magnetic powder | 800 parts |
| Vinyl chloride-vinyl acetate-vinyl alcohol copolymer (VAGH, a trade name of UCC, U.S.A.) | 110 parts |
| Polyurethane resin (Pandex T-5250, a trade name of Dainippon Ink Co., Japan) | 70 parts |
| Trifunctional polyisocyanate compound (Colonate L, a trade name of Nippon Polyurethane Ind., Japan) | 20 parts |
| n-Butyl stearate | 8 parts |
| Methylisobutyl ketone | 500 parts |
| Toluene | 500 parts |

The magnetic paint was coated on a polyester base film having a thickness of 12 μm and then dried to form a magnetic layer having a thickness of 3.5 μm followed by planishing by calendering treatment. Then the film with the magnetic layer was cut in a desired width to produce a magnetic tape.

EXAMPLE 2

In the same manner as in Example 1 except that an amount of cobalt sulfate was 200 g and an amount of nickel sulfate was 12 g, magnetic powder having a magnetic alloy layer consisting of cobalt-nickel on surfaces of the γ-Fe$_2$O$_3$ powder particles was prepared. The magnetic powder had the average length along major axis of 0.3 μm, the average axial ratio of 8, the coercive force of 625 Oe, the saturation magnetization of 89.4 emu/g and the BET specific surface area of 42.0 m$^2$/g. In the same manner as in Example 1, the magnetic powder was used to produce a magnetic tape.

EXAMPLE 3

In the same manner as in Example 1 except that the dispersion was heated at 90° C. and the radiation was neglected to form the magnetic layer, magnetic powder having a magnetic alloy layer consisting of cobalt-nickel on surfaces of the γ-Fe$_2$O$_3$ powder particles was prepared. The magnetic powder had the average length along major axis of 0.3 μm, the average axial ratio of 8, the coercive force of 535 Oe, the saturation magnetization of 90.1 emu/g and the BET specific surface area of 44.1 m$^2$/g. In the same manner as in Example 1, the magnetic powder was used to produce a magnetic tape.

EXAMPLE 4

In the same manner as in Example 1 except that the amount of cobalt sulfate was 210 g and nickel sulfate was omitted, magnetic powder having a magnetic metallic layer consisting of cobalt on surfaces of the γ-Fe$_2$O$_3$ powder particles was prepared. The magnetic powder had the average length along major axis of 0.32 μm, the average axial ratio of 8, the coercive force of 740 Oe, the saturation magnetization of 90.3 emu/g and the BET specific surface area of 42.8 m$^2$/g. In the same manner as in Example 1, the magnetic powder was used to produce a magnetic tape.

COMPARATIVE EXAMPLE 1

γ-Fe$_2$O$_3$ powder (100 g) having the average length along major axis of 0.3 μm, the average axial ratio of 8, the coercive force of 310 Oe and the saturation magnetization of 74.0 emu/g was dispersed in water (800 ml), and cobalt sulfate (14 g) and ferrous sulfate (48 g) were mixed with and dissolved in the dispersion. Then an aqueous solution of sodium hydroxide (42 g) in water (500 ml) was added to the dispersion and heated at 45° C. for 6 hours to proceed a reaction. Prepared magnetic powder had a cobalt ferrite layer on γ-Fe$_2$O$_3$ powder particles, as described in IEEE Trans. Magn., MAG-6, P2626 (1985) and had the average length along major axis of 0.32 μm, the average axial ratio of 8, the coercive force of 610 Oe, the saturation magnetization of 75.3 emu/g and the BET specific surface area of 41.0 m$^2$/g. In the same manner as in Example 1, the magnetic powder was used to produce a magnetic tape.

COMPARATIVE EXAMPLE 2

To an aqueous solution (3 liters) of sodium hydroxide of 5 mole/1 concentration, an aqueous solution (3 liters) of sodium hydroxide (0.7 mole/1) was added at room temperature with stirring to precipitate ferric hydroxide. Then the solution containing the ferrous hydroxide was subjected to air blowing at a rate of 5 1/min at 60° C. for thermal oxidation for 8 hours to prepare α-FeOOH. The α-FeOOH particles was surface treated with SiO$_2$, washed with water, filtrated, dried and dehydrated by heating in air at 800° C. for 2 hours to prepare α-Fe$_2$O$_3$ followed by thermal reduction in a hydrogen stream of 3 m$^3$/hour at 500° C. for 6 hours to prepare magnetic metallic iron powder. The magnetic powder had average the length along major axis of 0.35 μm, the average axial ratio of 20, the coercive force of 1,350 Oe, the saturation magnetization of 148 emu/g and the BET specific surface area of 43.8 m$^2$/g. In the same manner as in Example 1, the magnetic powder was used to produce a magnetic tape.

COMPARATIVE EXAMPLE 3

In the same manner as in Comparative Example 2 except that the aqueous solution of ferrous sulfate was added at 50° C. and air was blown at rate of 1 m$^3$/hour for thermal oxidation, magnetic metallic iron powder was prepared. The magnetic powder had the average length along major axis of 0.8 μm, the average axial ratio of 10, the coercive force of 920 Oe, the saturation magnetization of 155 emu/g and the BET specific surface area of 25.6 m$^2$/g. Then in the same manner as in Example 1, the magnetic powder was used to produce a magnetic tape.

COMPARATIVE EXAMPLE 4

In the same manner as in Example 1 except that the magnetic layer on γ-Fe$_2$O$_3$ powder constituting the nuclear crystal (the BET specific area: 47.2 m$^2$/g) was not formed and the γ-Fe$_2$O$_3$ powder is used as the magnetic powder, a magnetic tape was produced.

COMPARATIVE EXAMPLE 5

In the same manner as in Example 1 except that cobalt sulfate was not used and the amount of nickel sulfate was 196 g, magnetic powder having a magnetic metallic layer consisting of nickel on surfaces of the γ-Fe$_2$O$_3$ powder particles was prepared. The magnetic powder had the average length along major axis of 0.33 μm, the average axial ratio of 8, the coercive force of 325 Oe, the saturation magnetization of 68.7 emu/g and the BET specific surface area of 40.8 m$^2$/g. In the same manner as in Example 1, the magnetic powder was used to produce a magnetic tape.

COMPARATIVE EXAMPLE 6

In the same manner as in Example 1 except that the amount of cobalt sulfate was 84 g and the amount of nickel sulfate was 118 g, magnetic powder having a magnetic alloy layer consisting of cobalt-nickel on surfaces of the γ-Fe$_2$O$_3$ powder particles was prepared. The magnetic powder had the average length along major axis of 0.32 μm, the average axial ratio of 8, the coercive force of 390 Oe, saturation magnetization of 82.6 emu/g and the BET specific surface area of 41.0 m$^2$/g. In the same manner as in Example 1, the magnetic powder was used to produce a magnetic tape.

COMPARATIVE EXAMPLE 7

In the same manner as in Example 1 except that the amount of cobalt sulfate was 410 g and the amount of nickel sulfate was 20 g, magnetic powder having a magnetic alloy layer consisting of cobalt-nickel on surfaces of the γ-Fe$_2$O$_3$ powder particles was prepared. The magnetic powder had the average length along major axis of 0.35 82 m, the average axial ratio of 6, the coercive force of 1,030 Oe, the saturation magnetization of 98.8 emu/g and the BET specific surface area of 36.0 m$^2$/g. In the same manner as in Example 1 except that the amount of the magnetic powder compounded in magnetic paint was 750 parts, the magnetic powder was used to produce a magnetic tape.

COMPARATIVE EXAMPLE 8

In the same manner as in Example 1 except that an amount of cobalt sulfate was 16 g and an amount of nickel sulfate was 4 g, magnetic powder having a magnetic alloy layer of cobalt and nickel on surfaces of lhe γ-Fe$_2$O$_3$ powder particles was prepared. The magnetic powder had the average length along major axis of 0.30 μm, the average axial ratio of 8, the coercive force of 375 Oe, the saturation magnetization of 77.2 emu/g and the BET specific surface area of 46.8 m$^2$/g. In the same manner as in Example 1 except that the amount of the magnetic powder compounded in the magnetic paint was 750 parts, the magnetic powder was used to produce a magnetic tape.

Each magnetic tape in the above Examples and Comparative examples was tested in coercive force of the magnetic layer (Hc), a saturation magnetic flux density (Bs), squareness, surface roughness represented in terms of center line average height (Ra value), a maximum level of output power measured by means of Mn-Zn ferrite head at wavelength of 1 or 4 μm (a relative value based on a value (0 dB) of the magnetic tape of Comparative example 1), and durability represented in terms of the number of revolutions at which output power is decreased by 6 dB from the original output power when the tape is reproduced by running at relative rate of 5.8 m/sec with a head load of 5 g at 25° C. and 60% RH. The results are shown in the following table.

| Example No. | Magnetic properties | | | Surface roughness (μm) | Maximum output level (dB) | | Durability (revolutions) |
| --- | --- | --- | --- | --- | --- | --- | --- |
| | Hc (Oe) | Bs (gauss) | Squareness | | 1 μm | 4 μm | |
| 1 | 570 | 2,280 | 0.80 | 0.011 | +3.0 | +2.8 | 630 |
| 2 | 650 | 2,200 | 0.81 | 0.012 | +3.2 | +2.4 | 660 |

-continued

| Example No. | Magnetic properties | | | Surface roughness (μm) | Maximum output level (dB) | | Durability (revolutions) |
|---|---|---|---|---|---|---|---|
| | Hc (Oe) | Bs (gauss) | Square-ness | | 1 μm | 4 μm | |
| 3 | 540 | 1,990 | 0.78 | 0.014 | +2.0 | +1.9 | 550 |
| 4 | 750 | 2,060 | 0.82 | 0.012 | +3.5 | +2.0 | 710 |
| Comp. 1 | 620 | 1,720 | 0.80 | 0.011 | 0 | 0 | 520 |
| Comp. 2 | 1,350 | 3,600 | 0.82 | 0.014 | +1.8 | +0.8 | 80 |
| Comp. 3 | 930 | 3,690 | 0.83 | 0.035 | −1.5 | −0.6 | 140 |
| Comp. 4 | 320 | 1,690 | 0.80 | 0.012 | −3.2 | −1.0 | 480 |
| Comp. 5 | 340 | 1,510 | 0.68 | 0.015 | −4.0 | −1.3 | 110 |
| Comp. 6 | 410 | 1,880 | 0.72 | 0.013 | −0.2 | +0.2 | 220 |
| Comp. 7 | 1,050 | 2,350 | 0.77 | 0.018 | +1.0 | +0.8 | 590 |
| Comp. 8 | 390 | 1,770 | 0.80 | 0.012 | −0.7 | −0.2 | 540 |

From these results, it is clear that the magnetic tapes according to the present invention (Examples 1 to 4) which comprises the magnetic powder having magnetic layers on surfaces of $\gamma$-$Fe_2O_3$ nuclear crystal and which have the coercive force and the saturation magnetization of the specified ranges, have high output power and good durability. In contrast, the magnetic tapes (Comparative Examples 1 and 4), which contain the magnetic powder consisting of the oxides, have low coercive force but low saturation magnetic flux density and very low output power. Among the magnetic tapes utilizing the metallic powder, when the magnetic powder consists of fine particles (Comparative Example 2), high output is not achieved due to very high coercive force in case of using the ferrite head, and when the magnetic powder consists of coarse particles (Comparative Example 3), the magnetic tape has low coercive force but very low output power due to decrease of the surface smoothness. Thus in both cases the magnetic tape has very poor durability. The magnetic tape having the magnetic metallic layer not containing cobalt as the main component (Comparative Examples 5 and 6) has poorer durability than the magnetic tape according to the present invention. When the magnetic tape have the magnetic layer having coercive force or saturation magnetic flux density outside the ranges defined by the present invention (Comparative Examples 7 and 8), even if the magnetic layer contains the magnetic powder containing cobalt as the main component, it also provide poor output power.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium which comprises a non-magnetic substrate and a magnetic layer formed thereon, said magnetic layer containing a magnetic powder and a binder, said magnetic powder comprising a nuclear crystal consisting of magnetic oxide powder and a magnetic metallic layer formed thereon containing cobalt, said magnetic layer having a coercive force of not more than 1,000 Oe, a saturation magnetic flux density of not less than 1,800 gauss and a saturation magnetization of not less than 80 emu/g.

2. The magnetic recording medium according to claim 1, wherein said magnetic metallic layer contains not less than 50% by weight of cobalt.

3. The magnetic recording medium according to claim 1, wherein said magnetic layer contains said magnetic powder in an amount of from 40 to 90% by weight based on the total weight of said magnetic layer.

4. The magnetic recording medium according to claim 1, wherein said nuclear crystal consisting of said magnetic oxide is selected from at least one of iron oxide powder, cobalt-containing iron oxide powder, barium ferrite powder or chromium oxide powder.

5. The magnetic recording medium according to claim 1, wherein said magnetic layer has a surface roughness represented in terms of center line average height of not more than 0.03 μm measured by a tracer type surface roughness meter.

6. The magnetic recording medium of claim 1, wherein said saturation magnetization is from 80 to 110 emu/g.

* * * * *